Mar. 3, 1925. 1,528,446
C. B. MARTIN
RUBBER CUTTING MACHINE
Filed July 17, 1922    2 Sheets-Sheet 1
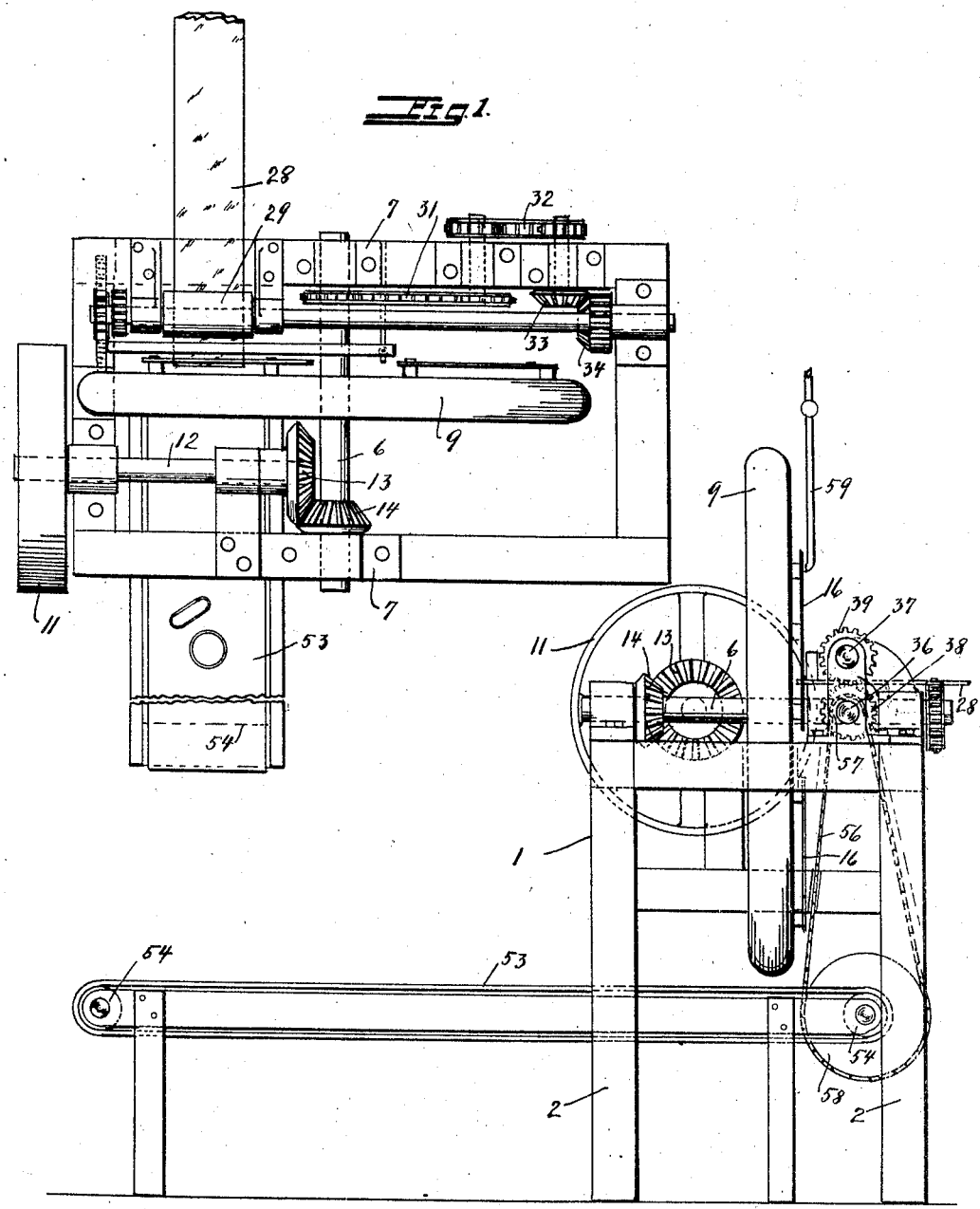

Mar. 3, 1925.
C. B. MARTIN
1,528,446
RUBBER CUTTING MACHINE
Filed July 17, 1922　　2 Sheets-Sheet 2
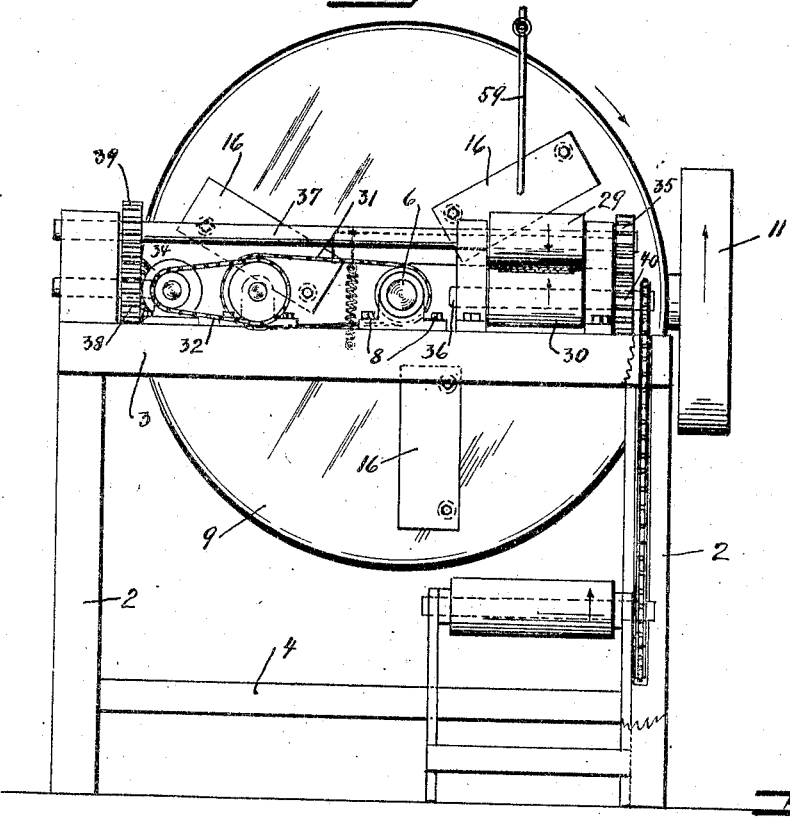
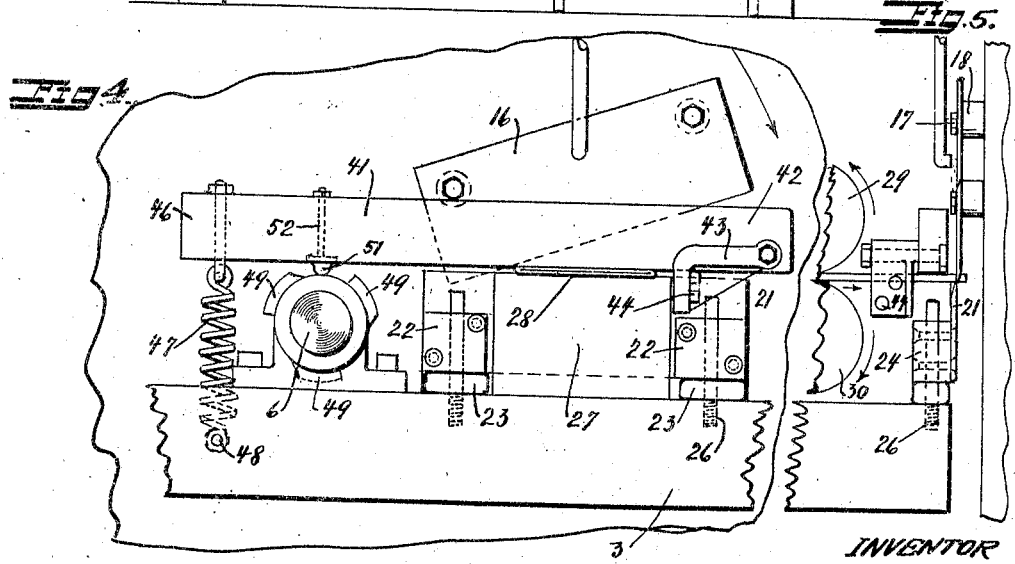
INVENTOR
Charles B. Martin
BY
ATTORNEYS Patented Mar. 3, 1925.

1,528,446

UNITED STATES PATENT OFFICE.

CHARLES BACHMAN MARTIN, OF PORTLAND, OREGON.

RUBBER-CUTTING MACHINE.

Application filed July 17, 1922. Serial No. 575,643.

*To all whom it may concern:*

Be it known that I, CHARLES BACHMAN MARTIN, a citizen of the United States, and a resident of Portland, county of Multnomah, State of Oregon, have invented a new and useful Rubber-Cutting Machine, of which the following is a specification.

The present invention relates to improvements in cutting machines for rubber or other flexible material and has particular reference to a machine adapted to cut the inner tube of a motor vehicle into rubber bands of any desired thickness. The principal object of the invention is to provide a machine of the character described that will operate quickly and economically, that will feed automatically and cause the tube to alternately stop and advance so as to remain stationary during the cutting operation and to advance to a new position during the interval between two cutting operations. It is further proposed to use, for my device, a rotary cutter which allows of a large number of cutting operations in a very short time. It is further proposed to regulate the stops and the advances of the tube to correspond with the cutting operations. Further objects and advantages of the invention will appear as the specification proceeds.

The preferred form of the invention is shown in the accompanying drawing in which Figure 1 represents a top plan view of the same; Figure 2 an end elevation; Figure 3 a side elevation; Figure 4 an enlarged detail view illustrating the mechanism for stopping and releasing the tire and Figure 5 an end elevation of the mechanism shown in Figure 4. While I have illustrated only the preferred form of my invention I wish to have it understood that various changes or modifications may be made within the scope of the claims hereto attached without departing from the spirit of the invention.

My device is shown as being supported on the frame (1) comprising preferably four upright members (2) joined at the top by horizontal members (3) and lower by bracing members (4). The main shaft (6) is journaled in the bearing (7) secured to the frame and has the wheel or disc (9) supported thereon. Rotary motion is imparted to the shaft (6) and the wheel from the pulley (11) driving the shaft (12) and actuating the shaft (6) through the beveled gears (13 and 14). The disc (9) supports on its side a plurality of blades (16) arranged radially and held by means of bolts (17) screwed into spacing members (18) rising from the face of the disc. These blades are adapted to pass and co-operate with a stationary blade (21) secured to the blocks (22) resting on cushioning members (23) and slidable on pins (24) threadedly engaging one of the frame members (3) as shown at (26). The blade (21) bears against the guide member (27) for the inner tube (28) which latter is advanced on its guide by means of two rolls (29) and (30). The upper one (29) of these rolls engaging the upper surface of the tube receives its rotary motion from the main shaft (6) through the chains (31 and 32), the beveled gears (33) and (34) and the spur gears (38 and 39), the latter being mounted on the shaft (37) supporting the upper roll. The lower roll (30) which is mounted on the shaft (36) receives its motion from the shaft (37) through the cog wheels (35) and (40). The speed at which the tube advances can of course be regulated to a nicety by the proper selection of gear ratios.

It is desired that the tube remain stationary during the cutting operation and for this purpose I introduce the clamping member (41) one end (42) of which is pivotally supported on the bracket (43) secured to the guide member (27) as shown at (44) while the other end (46) is normally forced downward by means of a spring (47), the lower end of which is secured to the frame member (3) as shown at (48). The clamping member stretches across the path of the tube to be cut and when in its downward position prevents the forward end of the tube from advancing without interfering with the advance of the intermediate portion of the tube engaged between two rolls. To release the tube and to allow the same to advance during the intervals between the cutting operations I provide a plurality of cams (49) on the main shaft (6) which engage the rounded head (51) of a bolt (52) secured in the clamping member and lifts the latter during the time of the engagement whereby the tube is released temporarily.

The rubber bands cut off from the tube are allowed to drop on the conveyor (53) supported on the drums (54) and actuated by the chain (56) passing over the sprocket wheel (57) on the shaft (36) and a sprocket wheel (58) mounted co-axially with the drum (54). To prevent heating of the tube and the blades I allow water to drop on the tube where the cutting operation takes place through the pipe (59). The operation of the device will be readily understood from the foregoing description. Applying power to the pulley (11) causes the main shaft (6) and the blade carrying disc (9) to rotate so as to co-operate with the stationary blade (21) in a scissor-like cutting action. The tube resting on the guide member (27) is advanced steadily by the rollers (29 and 31) actuated by the shaft (6) through the chains (31) and (32) but its forward end is alternately stopped and released by the clamping member (41) actuated by the cams (49) and the spring (47) so that the tube is firmly held in its place over the stationary blade with a short end protruding beyond the same during each cutting operation while it is allowed to advance between the cutting operations. The pieces cut off during the operation of the machine fall on the conveyor (53) from which they are removed by the operator.

I claim:

1. In a device of the character described, a guide member, a blade resiliently supported in operative proximity to the same, means for advancing an element to be cut toward the blade, clamping means operating near the blade normally holding the front end of the element in fixed relation to the blade, a disc having a blade thereon, means for rotating the disc so that its blade co-operates with the resiliently mounted blade in cutting the element while the same is clamped, and cam means adapted to intermittently release the clamp and to permit the front end of the element to pass over the blade.

2. In a device of the character described means for intermittently holding and releasing an advancing element to be cut, comprising a supporting member for the element, a transverse member pivotally supported on one side of the element having spring means associated with its free end for normally clamping the element to its support and a rotating cam engaging the transverse member for intermittently releasing the element from the clamping action.

3. The herein described method of making rubber bands which consists in continuously feeding a soft rubber tube in one direction while successively flattening the tube to bring its walls into contact and of shearing the flattened tube transversely in succession with the process of flattening said tube to form rubber bands.

CHARLES BACHMAN MARTIN.

Witnesses:
S. B. MARTIN,
E. SWEENEY.